(12) United States Patent
Falcaro

(10) Patent No.: US 9,452,767 B2
(45) Date of Patent: Sep. 27, 2016

(54) METHOD AND APPARATUS FOR TRANSPORTING CARTS

(71) Applicant: Steven M. Falcaro, Sugar Hill, GA (US)

(72) Inventor: Steven M. Falcaro, Sugar Hill, GA (US)

( * ) Notice: Subject to any disclaimer, the term of this patent is extended or adjusted under 35 U.S.C. 154(b) by 0 days.

(21) Appl. No.: 14/983,716

(22) Filed: Dec. 30, 2015

(65) Prior Publication Data

US 2016/0194018 A1 Jul. 7, 2016

Related U.S. Application Data

(60) Provisional application No. 62/124,766, filed on Jan. 2, 2015.

(51) Int. Cl.
*B62B 1/20* (2006.01)
*B62B 1/26* (2006.01)
*B62B 5/00* (2006.01)
*B62B 5/06* (2006.01)

(52) U.S. Cl.
CPC . *B62B 1/20* (2013.01); *B62B 1/26* (2013.01); *B62B 5/0089* (2013.01); *B62B 5/067* (2013.01)

(58) Field of Classification Search
CPC ............. B62B 1/18; B62B 1/20; B62B 1/22; B62B 1/26; B62B 5/0083; B62B 5/0086; B62B 5/0089; B62B 5/06; B62B 5/067; B65G 67/04
USPC ............................................ 280/47.24, 79.11
See application file for complete search history.

(56) References Cited

U.S. PATENT DOCUMENTS

| | | | | |
|---|---|---|---|---|
| 3,298,705 | A * | 1/1967 | Neaverson | B62B 1/08 254/2 R |
| 5,071,151 | A * | 12/1991 | Irwin | B62B 1/18 180/904 |
| 6,059,512 | A * | 5/2000 | Kielinski | B62B 5/0089 280/47.18 |
| 9,156,667 | B2 * | 10/2015 | Ebbenga | B66F 15/00 |
| 2003/0090074 | A1 * | 5/2003 | Smith | B62B 1/26 280/47.34 |
| 2004/0021280 | A1 * | 2/2004 | Peggs | B62B 1/125 280/47.24 |
| 2008/0107511 | A1 * | 5/2008 | Oberg | B62B 1/06 414/445 |

* cited by examiner

*Primary Examiner* — John Walters

(57) ABSTRACT

A cart transportation apparatus can be used to transport carts from one location to another. Utilizing the cart transportation apparatus can reduce damage to carts that need to be relocated for various reasons. Furthermore, the cart transportation apparatus can comprise a means to facilitate secure cart movement for carts with a variety of wheel sizes.

18 Claims, 6 Drawing Sheets

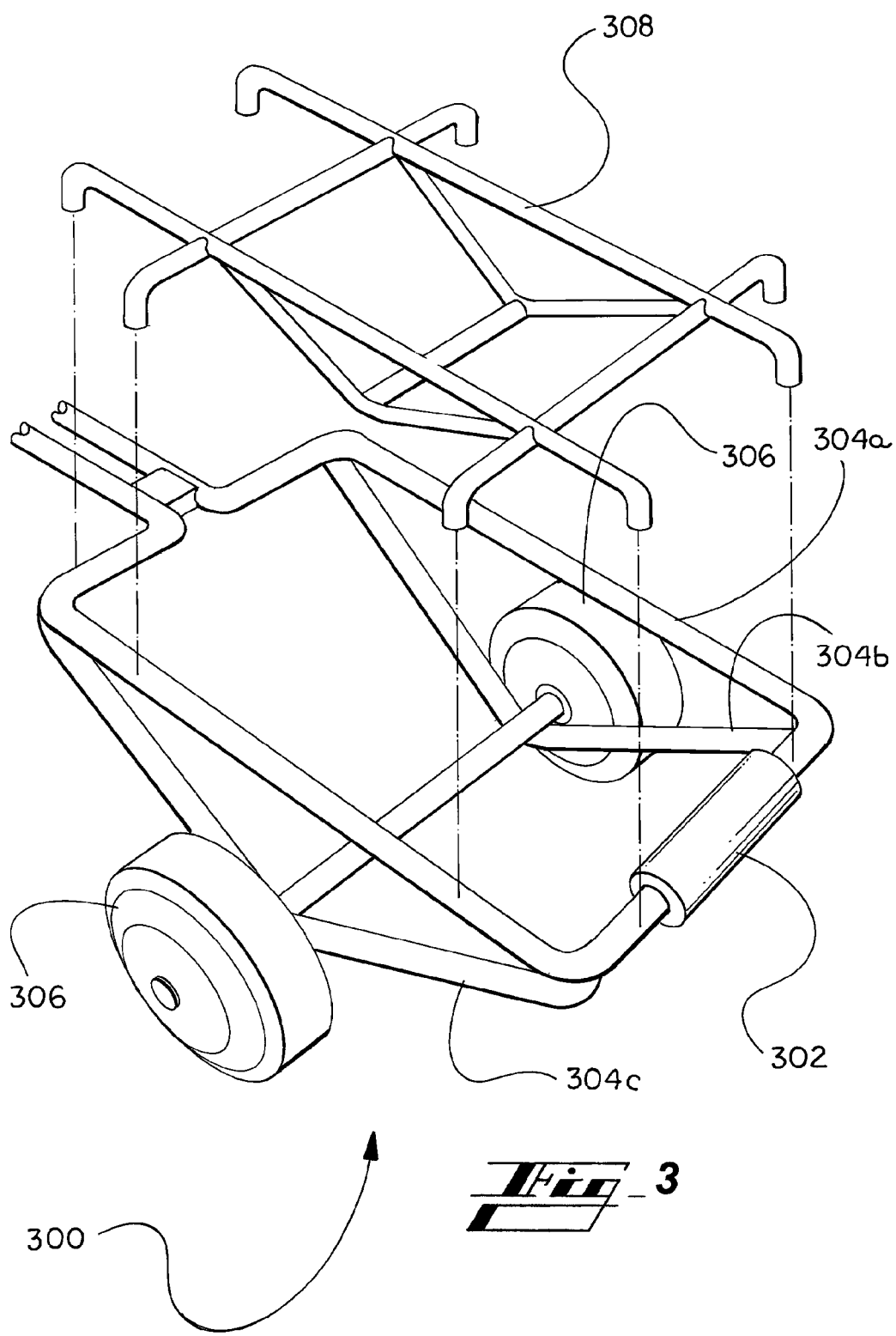
Fig_3

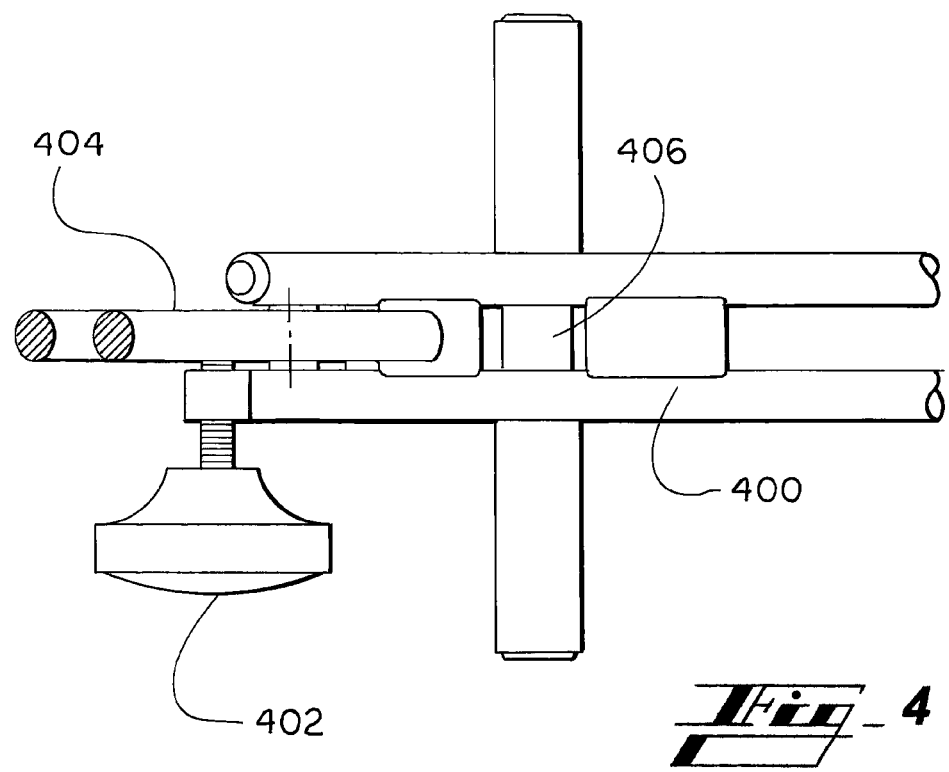
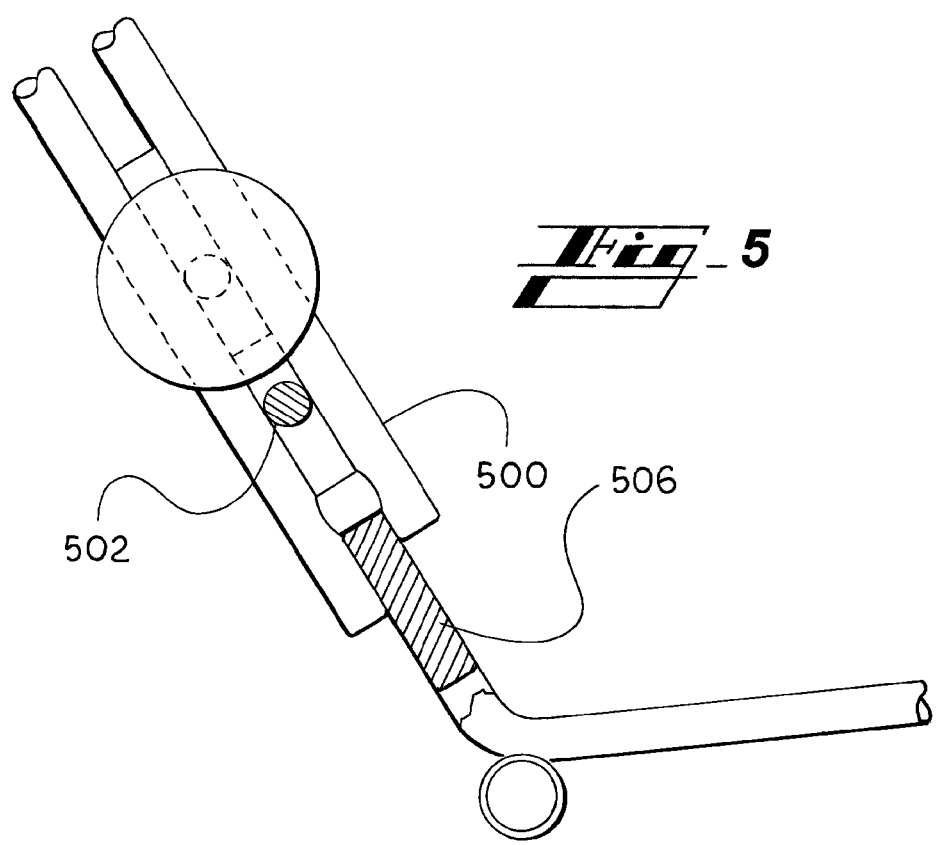

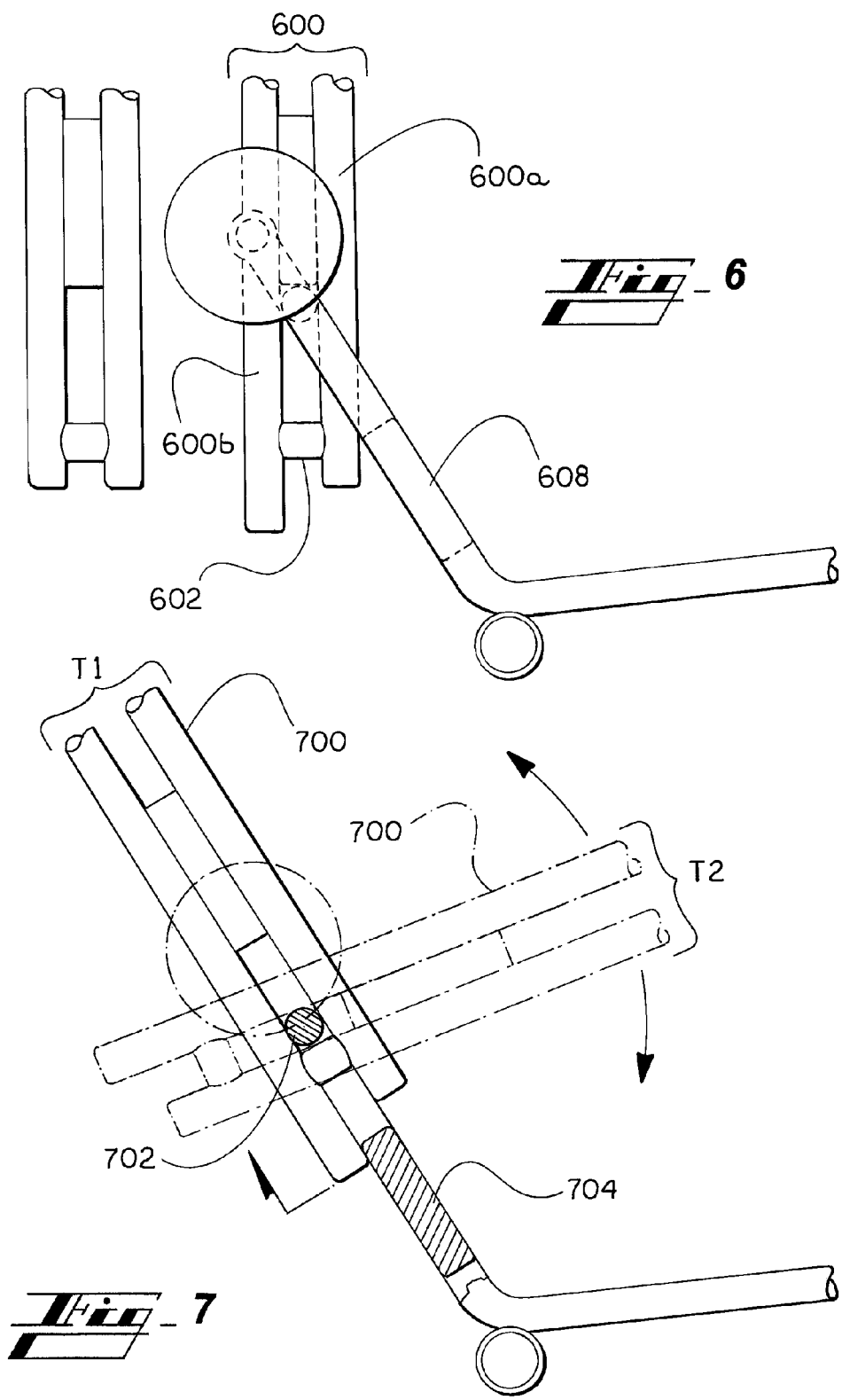

METHOD AND APPARATUS FOR TRANSPORTING CARTS

CROSS-REFERENCE TO RELATED APPLICATIONS

The present application claims the benefit of priority to U.S. provisional patent application Ser. No. 62/124,766, filed Jan. 2, 2015, and titled "Electric Cart Retrieval Dolly" the entirety of which is hereby incorporated herein by reference.

TECHNICAL FIELD

This disclosure relates generally to transporting motorized carts. More specifically, this disclosure relates to the use of an apparatus for securely moving motorized carts.

BACKGROUND

There are various types of motorized carts that have a variety of uses. Golf carts, carts for persons with disabilities, and shopping carts are of but a few types of motorized carts. Since motorized carts operate off a battery or electric charge, the charge/battery often dies at a location, which is remote to a charging station. For instance, when a grocery store cart battery dies outside in the parking lot, a grocery store employ usually must go retrieve the cart from the parking lot. Usually the store employee will drag the cart back to a recharging station. However, dragging the cart can cause damage to the wheels of the cart. Therefore, a means of transporting the cart is needed that can prevent damage to the cart.

The above-described background relating to motorized carts is merely intended to provide a contextual overview and is not intended to be exhaustive. Other context regarding the state of the art may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

This disclosure comprises a method an apparatus for safely transporting a wheeled cart. Although this disclosure can be used to transport an electric cart (generally with a dead battery), it can also be used to transport other non-electric carts. The cart transportation apparatus contained herein can comprise a frame, a handle, a cradle member, and a set of wheels. The cart transportation apparatus can be made from plastic, metal, wood, plastic polymers, etc.

The handle of the cart transportation apparatus can be shaped to support any pulling or pushing of the cart. For instance a distal end of the handle can be hook shaped, circular, multi-pronged, closed, etc. The other end of the handle can be attached to a shaft member of the cart transportation apparatus frame. The connection between the shaft member and the handle can be static or it can be dynamic. In a dynamic connection, the handle can be adjusted longitudinally or laterally. Various systems can be used to facilitated the longitudinal or lateral adjustments including, but not limited to: pulley systems, ball and bearing systems, pivot-and-lock systems, etc. For instance, the pivot-and-lock systems can comprise a rotatable means for the handle to be pivoted about an axis point attached to the shaft member. Once the handle is pivoted to a desired position, the handle can be locked in that position for use or for ease of storage. The handle can also be adjustably extendable to facilitate use by persons of various statures.

The shaft of the cart transportation apparatus can be of various lengths and can connect the handle to a cradle member. The cradle member can be various shapes and sizes to accommodate various cart wheels. For example, the top of the cradle member can comprise a square shape, a rectangular shape, an oval shape, or the like. The larger the area of the top of the cradle member, the larger the cart wheel it will accept. The cradle member can also be of a size that will allow it to accept multiple wheels for a cart that has multiple wheels on the front or the rear. The cradle member can support and lock a wheel(s) to allow the cart to be maneuvered and/or retrieved with ease.

Additionally, the cradle member can comprise multiple rods or rod-like members to create a three-dimensional repository to receive the cart wheel(s). The three-dimensional repository can comprise multiple shapes including, but not limited to: square, rectangular, triangular, etc. It should be noted that although two wheels are used to illustrate the cart transportation apparatus, either one or many wheels can be used. One or more wheels can be attached to the cradle member to facilitate movement of the cart transportation apparatus. The one or more wheels can be motorized, caster wheels, mutually exclusive of each other, or connected via an axle. Furthermore, the cradle member can comprise a roller device to allow the cart wheel(s) to roll over the leading edge of the cradle device and into the repository.

In some cases, the cart wheel(s) may be smaller than the cradle member, which can result in a lack of support. Consequently, a cradle adapter can be used to facilitate additional support for carts with smaller wheels. The cradle adapter can also comprise several rods or rod-like members. For example, the cradle adapter can comprise four rods where each rod intersects two other rods to form the perimeter of a rectangle at the top of the cradle adapter. The rods can also form cross-sections within the cradle adapter. It should be noted that like the cradle member, the cradle adapter can also comprise a multitude of shapes including, but not limited to: square, rectangular, circular, triangular, etc. Like the cradle member, the cradle adapter can also form a three-dimensional repository to receive the smaller cart wheel(s). Other rods can be used to form a support area upon which the smaller cart wheel(s) can lay. The rods can also be bent to allow them to stationarily rest on the cradle member. The cradle adapter can comprise a means to attach to the cradle member for additional support.

Described herein are systems, articles of manufacture, and other embodiments or implementations that can facilitate transportation of carts.

According to one embodiment, described herein is an apparatus for facilitating cart transportation. The apparatus can comprise a handle connected to a cradle member via a shaft. The apparatus can also comprise an axle for connecting wheels to the cradle member and providing support to the cart wheel(s).

According to another embodiment, described herein is an apparatus for facilitating cart transportation, wherein the apparatus comprises a handle connected to a shaft comprising a rectangular member. The apparatus can also comprise triangular members that are adjacent to opposite sides of the rectangular member, wherein an axle connects the triangular members.

According to yet another embodiment, described herein is a method for facilitating transportation of a cart, wherein the method comprises lifting a cart wheel to place the cart wheel in a cradle member, and adjusting a handle attached to the cradle member so that the cart can be pulled via the handle.

These and other embodiments or implementations are described in more detail below with reference to the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 3 illustrates a perspective view of an example cradle member and cradle adapter.

FIG. 4 illustrates a top view of an example adjustable handle.

FIG. 5 illustrates a side view of an example adjustable handle.

FIG. 6 illustrates a side view of an example adjustable handle in rotation.

FIG. 7 illustrates a side view of an example adjustable handle at time one and at time two.

DETAILED DESCRIPTION

Figure 1:
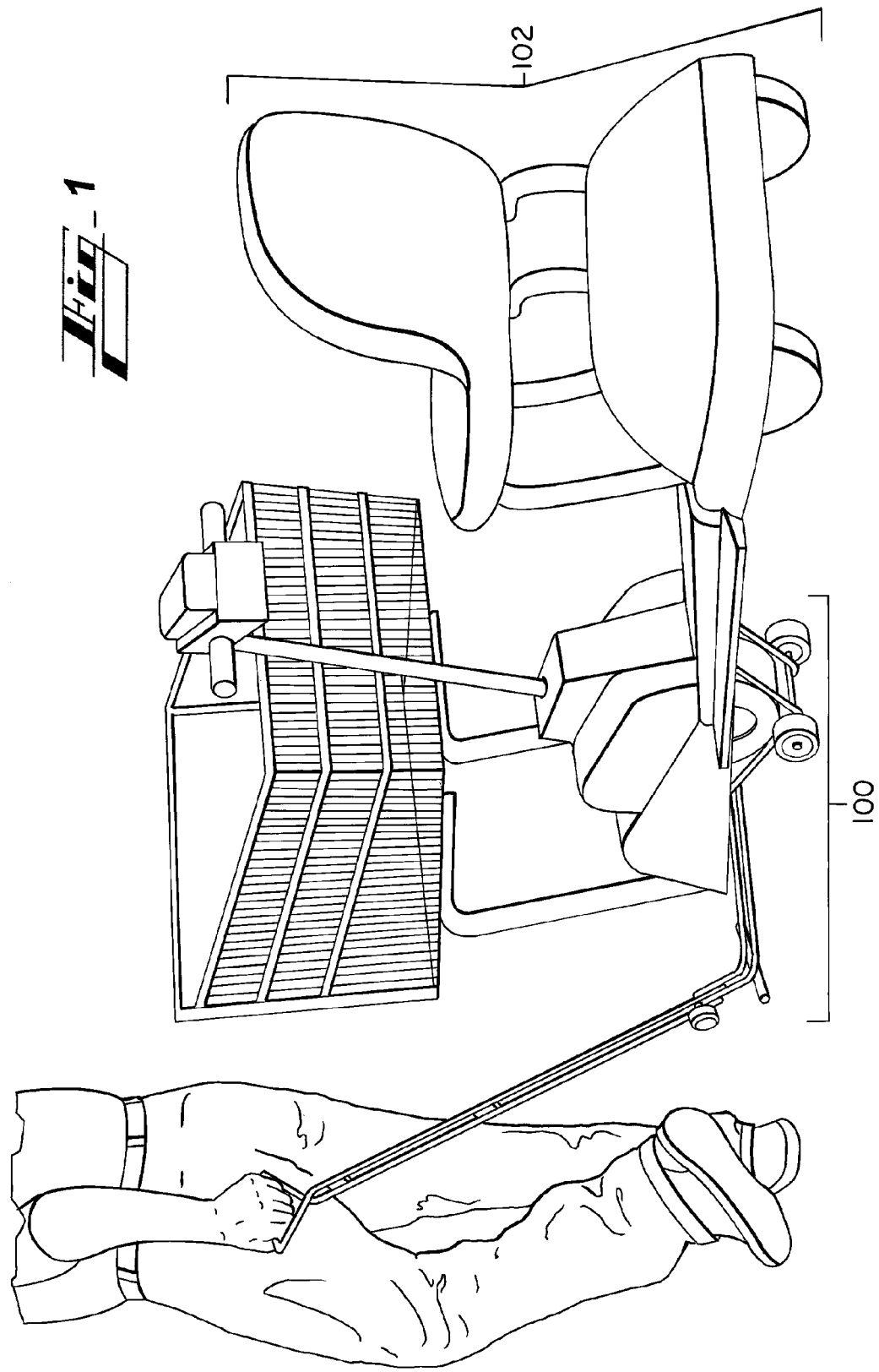
FIG. 1 illustrates an example cart transportation apparatus in use.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As an overview of the various embodiments presented herein, to correct for the above identified deficiencies and other drawbacks of using carts.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Referring now to FIG. 1, illustrated is an example cart transportation apparatus in use. The cart transportation apparatus 100 can be used to pull or push the cart 102. The front wheel of the cart 102 can be situated within a cradle member of the cart transportation apparatus 100 to provide for ease of transportation when moving the cart 102. It should be noted that in some instances, the cart transportation apparatus 100 can be adapted to receive the rear wheel(s) of the cart 102 as opposed to the front wheel.

Figure 2:
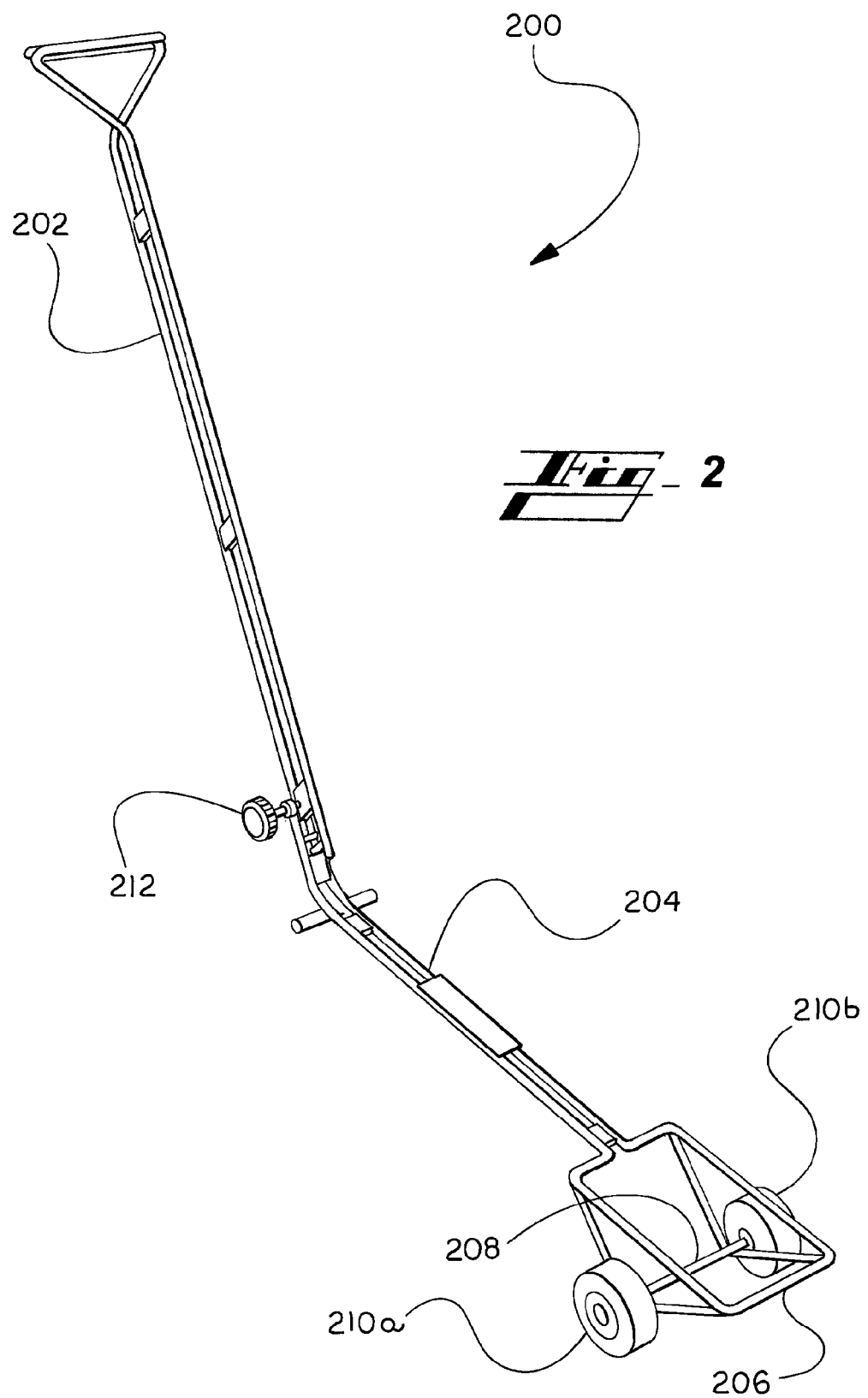
FIG. 2 illustrates a perspective view of an example cart transportation apparatus.

Referring now to FIG. 2, illustrated is a perspective view of an example cart transportation apparatus. The cart transportation apparatus 200 can comprise various components including, but not limited to: a handle 202, an adjustment mechanism 212, a shaft member 204, a cradle member 206, an axle 208, and wheels 210a, 210b. The handle 202 can be used to grasp and direct and the cart transportation apparatus 200 by pulling or pushing. The handle can be hook shaped, circular, multi-pronged, closed, etc. The handle 202 can be connected to a shaft member 204 of the cart transportation apparatus 200 frame. However, an adjustment mechanism 212 can be used to longitudinally or laterally adjust the handle 202 in relation to the shaft member 204. The adjustment mechanism 212 can comprise a pulley system, a ball and bearing system, and/or a pivot-and-lock systems.

The shaft member 204 of the cart transportation apparatus 200 can be of various lengths and can connect the handle 202 to a cradle member 206. The cradle member 206 can be various shapes and sizes to accommodate various cart wheels. For example, as shown in FIG. 2, the top of the cradle member 206 can comprise a rectangular shape. The cradle member can also be attached to wheels 210a, 210b via an axle 208. The axle 208 can be situated to rotatably connect the wheels 210a, 210b to the cradle member 206.

Referring now to FIG. 3, illustrated is a perspective view of an example cradle member and cradle adapter. The larger the area of the top of the cradle member 300, the larger the cart wheel it can accept. The cradle member 300 can also be of a size that will allow it to accept multiple wheels for a cart that has multiple wheels on the front or the rear. The cradle member 300 can support and lock a wheel(s) to allow the cart to be maneuvered and/or retrieved with ease.

As depicted in FIG. 3, the cradle member 300 can comprise several rod-like members to create a three-dimensional repository to receive the cart wheel(s). A top cradle member 304a can be connected to bottom cradle members 304b, 304c to form the three-dimensional repository of the cradle member 300. Furthermore, the cradle member can comprise a roller device 302 to allow the cart wheel(s) to smoothly roll over the leading edge of the top cradle member 304a and into the repository.

One or more wheels 306 can be attached to the cradle member 300 to facilitate movement of the cart transportation apparatus. The one or more wheels 300 can be motorized, caster wheels, mutually exclusive of each other, or connected via an axle.

In some cases, the cart wheel(s) may be smaller than the cradle member 300, which can result in a lack of support as the cart is being transported. Consequently, a cradle adapter 308 can be used to facilitate additional support for carts with smaller wheels. The cradle adapter 308 can also comprise several rods or rod-like members. For example, the cradle adapter can comprise four rods where each rod intersects two other rods to form the perimeter of a rectangle at the top of the cradle adapter. Like the cradle member 300, the cradle adapter 308 can also form a three-dimensional repository to receive the smaller cart wheel(s). Other rods can be used to form a support area upon which the smaller cart wheel(s) can rest. The cradle adapter 308 can comprise a means to attach to the cradle member 300 for additional support.

FIG. 4 illustrates a top view of an example adjustable handle. A pivot-and-lock system can comprise a rotatable means for the handle 404 to be pivoted about an axis point attached to the shaft member 400. Once the handle is pivoted to a desired position, the handle can be locked in that position by using a lock bar 406 and a rotation lock 402 for use or for ease of storage. The handle 404 can also be adjustably extendable to facilitate use by persons of various statures.

Referring now to FIG. 5, illustrated is a side view of an example adjustable handle. The side view illustrates the handle 500 pivoted about an axis point 502 and locked into the shaft member 506.

Referring now to FIG. 6, illustrated is a side view of an example adjustable handle in rotation. Handle 600 can be in a pivoting motion whereby the handle 600 is not locked into place via handle locking member 602 and shaft locking member 608. It should be noted that the handle can comprise a shorter handle member 600a and a longer handle member 600b connected by the handle locking member 602 to facilitate locking of the handle 600.

Referring now to FIG. 7, illustrated is a side view of an example adjustable handle at time one and at time two. At time T1 the handle 700 can be represented as being locked into the shaft locking member 704. However at time T2, the handle 700 can be represented as being pivoted about an axis point 702 in an unlocked position.

Figure 8:
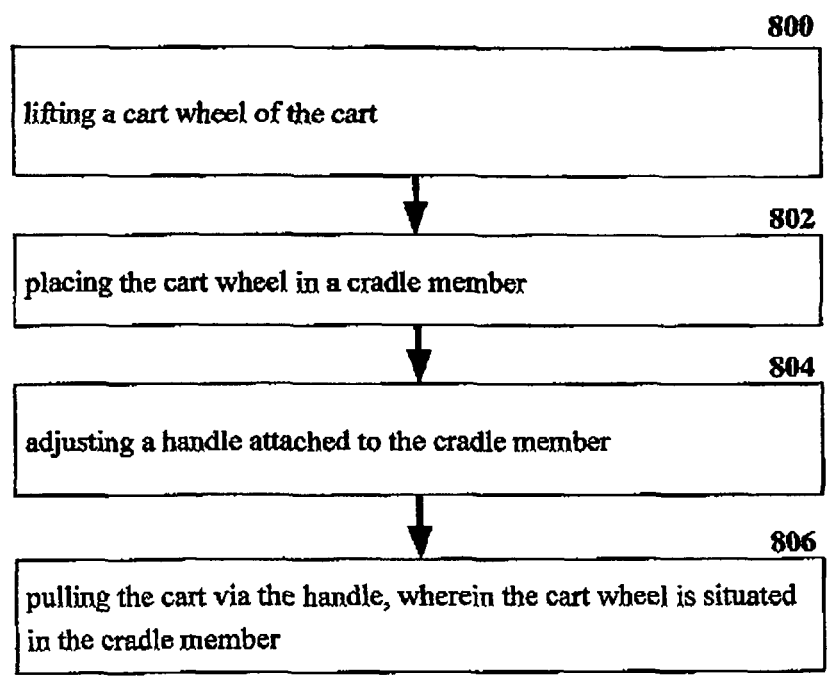
FIG. 8 illustrates is an example system block diagram for a method of using a transportation cart.

Referring now to FIG. 8, illustrated is an example system block diagram for a method of using a transportation cart. At element 800 a cart wheel of a cart can be lifted, and at element 802 the cart wheel can be placed in a cradle member. Furthermore, a handle attached to the cradle member can be adjusted to a desired position at element 804. Consequently, at element 806 the cart can be pulled via the handle, wherein the cart wheel is situated in the cradle member.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A cart transportation apparatus, comprising:
   a handle;
   a rotatable pivot-and-lock mechanism for locking the handle in a fixed position;
   a cradle member;
   a shaft; wherein the shaft connects the cradle member to the handle;
   a first wheel;
   a second wheel; and
   an axle, wherein the axle is connected to the cradle member and the axle connects the first wheel to the second wheel.

2. The apparatus of claim 1, further comprising:
   a cradle adapter wherein the cradle adapter is congruent to the cradle member.

3. The apparatus of claim 2, wherein the cradle adapter comprises four rods forming four cross-sections to hold a motorized wheel.

4. The apparatus of claim 3, wherein the four rods are adjustable to facilitate various sized motorized wheels.

5. The apparatus of claim 2, wherein the cradle member comprises a rectangular shape.

6. The apparatus of claim 2, wherein the cradle adapter comprises a square shape.

7. The apparatus of claim 1, further comprising: a roller attached to the cradle member.

8. The apparatus of claim 1, wherein the handle is adjustable.

9. The apparatus of claim 1, wherein the handle can pivot laterally about the shaft.

10. A cart transportation apparatus, comprising:
    a handle;
    a shaft, wherein the shaft comprises a rectangular member; a first triangular member;
    a second triangular member, wherein the first triangular member and the second triangular member are adjacent to opposite sides of the rectangular member;
    at least one wheel; and
    an axle, wherein the axle connects the at least one wheel to the first triangular member and the second triangular member.

11. The apparatus of claim 10, further comprising:
    an adapter member, wherein the adapter member comprises:
    four rods;
    a third triangular member;

a fourth triangular member; and
an attachment rod for connecting the third triangular member and the fourth triangular member.

12. The apparatus of claim 11, wherein the four rods intersect at a right angle.

13. The apparatus of claim 12, wherein a rod, of the four rods, comprises a bend at a distal end of the rod.

14. The apparatus of claim 13, wherein the rod, of the four rods, comprises a bend at another distal end of the rod.

15. A method of moving a cart, comprising:
lifting a cart wheel of the cart;
placing the cart wheel in a cradle member, wherein the placing the cart wheel in the cradle member comprises rolling the cart wheel over a roller member;
adjusting a handle attached to the cradle member; and
pulling the cart via the handle, wherein the cart wheel is situated in the cradle member.

16. The method of claim 15, further comprising: fitting a cradle adapter to the cradle member.

17. The method of claim 15, wherein the adjusting the handle comprises pivoting the handle about an axis point.

18. The method of claim 15, wherein the adjusting the handle comprises a lateral movement of the handle.

\* \* \* \* \*